(12) United States Patent
Hillenbrand

(10) Patent No.: US 10,013,876 B2
(45) Date of Patent: Jul. 3, 2018

(54) METHOD AND DEVICE FOR OPERATING A VEHICLE

(71) Applicant: Robert Bosch GmbH, Stuttgart (DE)

(72) Inventor: Stefan Hillenbrand, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 212 days.

(21) Appl. No.: 14/413,202

(22) PCT Filed: Jul. 3, 2013

(86) PCT No.: PCT/EP2013/064002
§ 371 (c)(1),
(2) Date: Jan. 6, 2015

(87) PCT Pub. No.: WO2014/009214
PCT Pub. Date: Jan. 16, 2014

(65) Prior Publication Data
US 2015/0154861 A1 Jun. 4, 2015

(30) Foreign Application Priority Data
Jul. 12, 2012 (DE) .......... 10 2012 212 175

(51) Int. Cl.
*G08G 1/01* (2006.01)
*B60W 30/16* (2012.01)
(Continued)

(52) U.S. Cl.
CPC .......... *G08G 1/0104* (2013.01); *B60W 30/10* (2013.01); *B60W 30/16* (2013.01); *B62D 15/025* (2013.01);
(Continued)

(58) Field of Classification Search
CPC . B60W 30/16; B60W 2550/20; B62D 15/025; B62D 15/026
See application file for complete search history.

(56) References Cited

U.S. PATENT DOCUMENTS

2008/0125972 A1* 5/2008 Neff .................. B60W 40/02
701/300
2009/0037089 A1* 2/2009 Tkachenko ............ G08G 1/04
701/118
(Continued)

FOREIGN PATENT DOCUMENTS

CN 102122437 A 7/2011
DE 10 2007 027 495 12/2008
(Continued)

OTHER PUBLICATIONS

International Search Report for PCT/EP2013/064002, dated Jan. 28, 2014.

*Primary Examiner* — Jerrah Edwards
*Assistant Examiner* — Mathew Franklin Gordon
(74) *Attorney, Agent, or Firm* — Norton Rose Fulbright US LLP; Gerard Messina

(57) ABSTRACT

In a method for operating a vehicle which is moving on a roadway, a traffic flow of other vehicles in the surroundings of the vehicle is detected and, if the detected traffic flow corresponds to a traffic jam, a transverse guidance of the vehicle is regulated in order to reduce a lateral distance between the vehicle and one of the other vehicles.

13 Claims, 2 Drawing Sheets

(51) Int. Cl.
*B62D 15/02* (2006.01)
*B60W 30/10* (2006.01)
(52) U.S. Cl.
CPC ......... *B62D 15/026* (2013.01); *G08G 1/0145* (2013.01); *B60W 2550/14* (2013.01); *B60W 2550/141* (2013.01); *B60W 2550/20* (2013.01)

(56) References Cited

U.S. PATENT DOCUMENTS

| | | | | |
|---|---|---|---|---|
| 2010/0060482 | A1* | 3/2010 | Emam | G08G 1/09 340/905 |
| 2010/0100284 | A1* | 4/2010 | Kudo | B62D 15/025 701/42 |
| 2010/0250111 | A1* | 9/2010 | Gutierrez | G01C 21/3697 701/532 |
| 2011/0153136 | A1* | 6/2011 | Anderson | G05D 1/0219 701/25 |

FOREIGN PATENT DOCUMENTS

| | | |
|---|---|---|
| DE | 10 2008 025 707 | 12/2009 |
| EP | 24 23 902 | 2/2012 |
| EP | 2 533 522 A1 | 12/2012 |
| GB | 2 358 506 | 7/2001 |
| JP | 2004118608 A | 4/2004 |
| JP | 2008269170 A | 11/2008 |
| JP | 2012108797 A | 6/2012 |
| WO | WO 2007/145 564 | 12/2007 |
| WO | WO 2011/081 609 | 7/2011 |

* cited by examiner

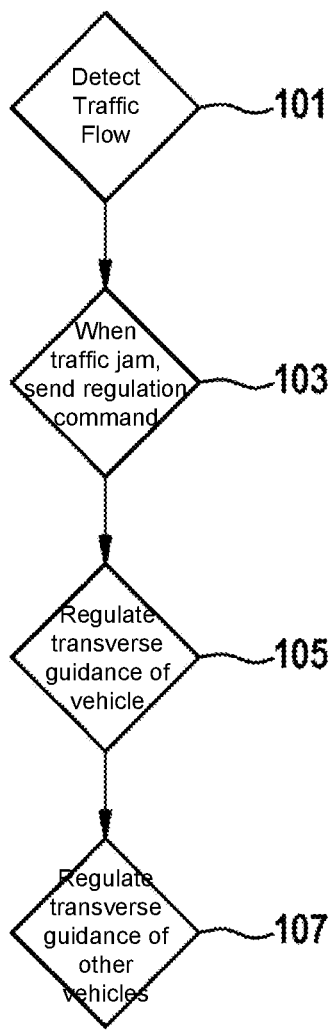
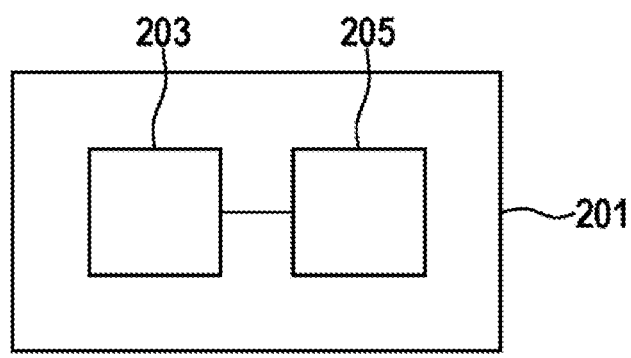

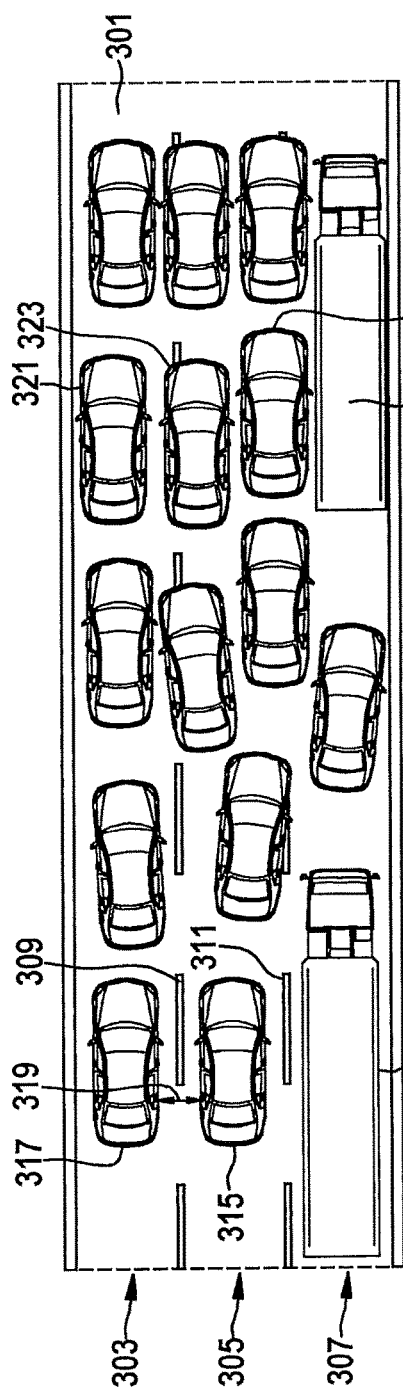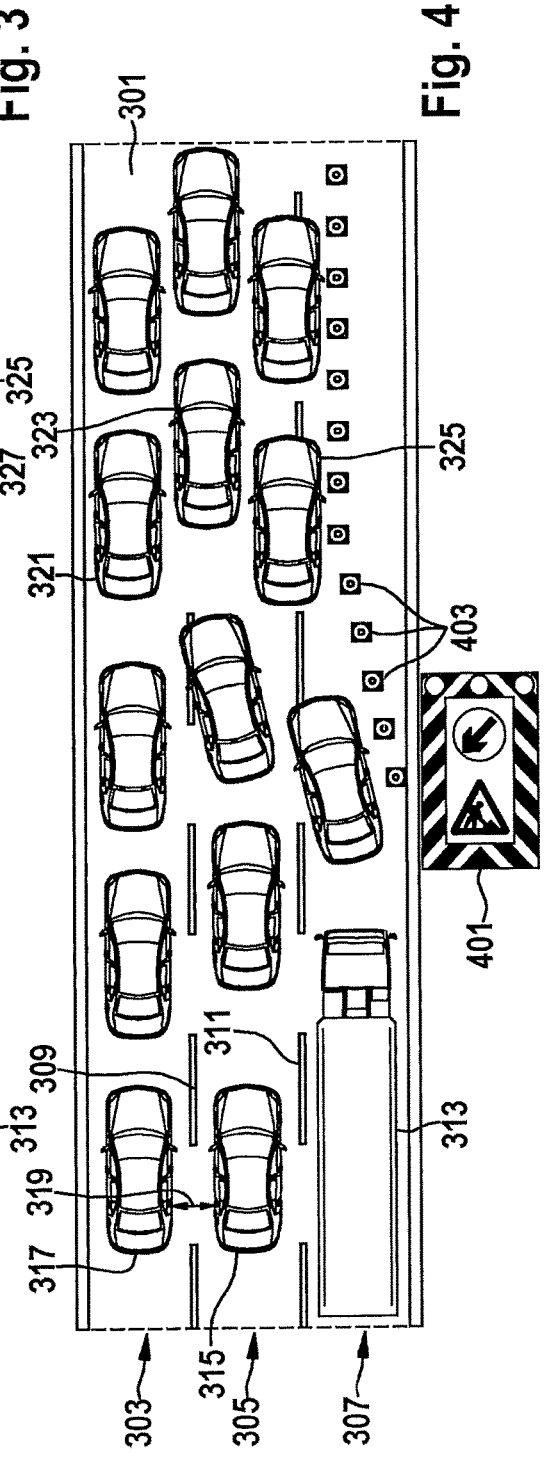

METHOD AND DEVICE FOR OPERATING A VEHICLE

BACKGROUND OF THE INVENTION

1. Field of the Invention

The present invention relates to a method, a computer program, and to a device for operating a vehicle.

2. Description of the Related Art

A method and a device for determining traffic routing information for a vehicle are known from Published German patent application document DE 10 2008 025 707 A1. Here, position data and time data of one other vehicle in surroundings of the vehicle are detected. The detected position data and time data are transmitted to the vehicle. Based on the received position data and time data of the other vehicle, traffic routing information is determined for the vehicle. Here it may be provided that the traffic routing information is provided to a driver assistance system of the vehicle. The driver assistance system of the vehicle may adjust a speed of the vehicle to the roadway course ahead of the vehicle based on the traffic routing information provided to it.

BRIEF SUMMARY OF THE INVENTION

The object underlying the present invention may be seen as providing a method for operating a vehicle which allows for an efficient and effective vehicle guidance and traffic routing.

It is another object of the present invention to provide a corresponding device.

Moreover, the object of the present invention may also be regarded as providing a corresponding computer program.

According to one aspect, a method is provided for operating a vehicle which is moving on a roadway. A traffic flow of additional vehicles in the surroundings of the vehicle is detected. If the detected traffic flow corresponds to a traffic jam, a transverse guidance of the vehicle is regulated in order to decrease a lateral distance between the vehicle and one of the other vehicles.

According to one other aspect, a device for operating a vehicle is provided. The device includes a receiver for receiving a regulation command transmitted externally from the vehicle, a regulation being provided for regulating a transverse guidance which is dependent on the received regulation command, in order to decrease the distance between the vehicle and one other vehicle in the surroundings of the vehicle.

According to yet another aspect, a computer program is provided, which includes program code for carrying out the method for operating a vehicle which is moving on a roadway when the computer program is executed on a computer.

By automatically decreasing the lateral distance between the two vehicles in the case of a traffic jam, more space on the roadway is created in an advantageous way which may then be used, for example, by rescue vehicles. It is thus also possible in an advantageous way to guide the vehicle automatically around an obstacle, for example, a road work site or an accident, which caused the traffic jam.

Due to the automatic regulation of the transverse guidance of the vehicle during the traffic jam, the vehicle guidance may react correspondingly adequately to the traffic jam, usually in a better way than a human driver would generally be able to react.

A traffic jam within the sense of the present invention may also be referred to as a jam, and generally refers to a traffic flow which stops frequently or has come to a standstill on a roadway. This means in particular that a plurality of vehicles per unit of time or per route length is greater than a predetermined threshold value. A jam exists in particular when traffic, i.e., the vehicles, flows at a speed of less than 40 km/h, in particular less than 20 km/h, preferably less than 12 km/h. The term traffic jam as it is used in the present case includes traffic flow which has come to a standstill as well as traffic flow which stops frequently.

Transverse guidance within the sense of the present invention means in particular that a steering angle of the vehicle is modified.

A roadway within the sense of the present invention includes in particular one or several traffic lane(s), which are delimited from one another with the aid of road markings. Furthermore, a roadway generally includes in particular road markings to delimit the roadway from an emergency lane or a parking lane.

The lateral distance between two vehicles means in particular the minimal distance between the two vehicles when they are positioned next to one another relative to their longitudinal direction.

According to one specific embodiment it may be provided that a respective transverse guidance of further vehicles is regulated, in order to set a respective lateral distance between the vehicles, so that more vehicles are traveling next to one another on the roadway than before the beginning of the regulation. In this way, it is effectuated in an advantageous way that an existing width of the roadway is utilized efficiently. Thus, more vehicles may pass a given road section. A traffic flow may be increased so that the traffic jam may disperse more quickly.

It may thus in particular be provided that in the case of a roadway with multiple traffic lanes and corresponding road markings, these road markings are ignored in the regulation, i.e., they are not taken into account. This means in particular that the vehicles may drive across the road markings or move over them.

Generally, in a non-traffic jam situation, i.e., when there is no traffic jam occurring, known driver assistance systems are typically only designed to guide the vehicles within the road markings. The regulation and the ignoring thus result in an additional lane being opened or formed, i.e., in addition to the traffic lanes already delimited from one another with the aid of the road markings.

Since traffic lanes are generally chosen to be sufficiently wide in order to guarantee a sufficient lateral distance between the vehicles, a sufficient safety margin is available which may now be used to guide at least one additional other vehicle on the roadway in a lateral direction.

In another specific embodiment, it may be provided that a respective lateral guidance of the additional vehicles is regulated in order to establish a respective lateral distance between the vehicles so that when the width of the roadway designed for the movement of the vehicles is reduced, the number of vehicles moving next to each other after the beginning of the regulation is equal to or greater than the number of vehicles moving next to each other before the beginning of the regulation.

Such a reduction may occur, for example, when a traffic lane is closed due to a road work site or an accident. Despite the fact that there is now one fewer traffic lane available it is compensated for by correspondingly setting the respective lateral distance between the vehicles, which leads to the number of vehicles driving next to one another remaining at least constant, preferably increasing, after the regulation was carried out and/or in particular after the local beginning of the closure or the starting point of the reduced width.

In another specific embodiment it may be provided that the regulation is carried out as a function of a parameter, in particular multiple parameters selected from the following group of parameters: a kinematic variable of a vehicle, status of a turn signal of a vehicle, status of a break light of a vehicle, geometric width of a vehicle, width of the roadway.

A kinematic variable within the sense of the present invention denotes in particular a physical variable which may describe a respective movement of the vehicles. For example, the kinematic variable may be a position, a speed, or an acceleration, as well as a negative acceleration, meaning a deceleration, of a vehicle. A kinematic variable may, for example, be the instantaneous kinematic variable. This means in particular that an instantaneous speed or an instantaneous acceleration of a vehicle is detected. It may preferably be provided that the kinematic variable is an expected kinematic variable. This means in particular that this is a kinematic variable which the vehicle will probably have in the future. This is preferably the expected position of the vehicle, the expected speed of the vehicle, or the expected vehicle acceleration or the acceleration of the vehicle.

In one specific embodiment, it may be provided that parameters are communicated between the vehicles. This means in particular that parameters, which apply to the respective vehicle, are transmitted to the other vehicles and received by these vehicles. The vehicles are interconnected in particular with each other regarding a communication and thus communicate with each other. One such communication is known by the fixed term Car-to-Car (C2C) communication.

In another specific embodiment, it may be provided that in addition to the regulation of the transverse guidance, the longitudinal guidance of the vehicle or vehicles is regulated. The statements mentioned in connection to the regulation of the transverse guidance and the statements to be mentioned later are applicable analogously to the longitudinal guidance.

In another specific embodiment, it may be provided that the regulation is carried out as a function of the respective regulation command which is received by the vehicles, this regulation command being transmitted to the vehicles with the aid of a main computer which is located externally of the vehicles. Such a communication between vehicles and the main computer as a stationary infrastructure may also be called a C2I (Car to Infrastructure) communication.

In one specific embodiment, it may be provided that a communication device is provided which is designed to communicate with one other vehicle and/or the main computer. The communication device thus preferably includes a transmitter and receiver for exchanging parameters or for receiving regulation commands. Preferably, each vehicle includes a communication device.

A regulation command includes in particular information about how the specific regulation must be carried out by the vehicles. The regulation command is formed in particular based on parameters which are sent by the vehicles to the main computer. This means that the vehicles may preferably send their parameters to the main computer. The regulation command is preferably based on further information or traffic data, for example a release from the police or the fire department on whether an emergency lane may be used for driving or not.

In another specific embodiment, it may be provided that the regulation command is selected from the following group of regulation commands: Starting command for initiating the regulation, stopping command for stopping the regulation, resumption command for resuming the regulation after stopping the regulation.

The main computer usually receives traffic data which describe a traffic or a traffic flow along the driving route of the vehicle. The traffic data include in particular information about a possible traffic jam or possible slow-moving traffic. Traffic data include in particular information about obstacles, accidents, or work sites along the driving route.

Based on the traffic data and the received parameters the main computer may form an optimal strategy for regulating the transverse guidance and/or the longitudinal guidance of the vehicles and send corresponding regulation commands to the vehicles. Based on this, the vehicles then regulate the transverse guidance and the longitudinal guidance.

It is thus possible in an advantageous way that preferably within certain sections of the roadway, for instance from an entry to a site of an accident at the beginning of the traffic jam, there is enough space for rescue vehicles.

In one specific embodiment, it may be provided that the parameters are detected with the aid of a detector unit. A detector unit may, for example, include one or multiple sensors. For example, a GPS sensor may be provided to detect a position. Here, GPS refers to Global Positioning System. Other sensors are, for example, wheel speed sensors, acceleration sensors, steering angle sensors and rotation rate sensors. Such sensors are usually already built into systems for regulating the driving dynamic and driving stability and detect the proper vehicle motion using sensors. Other advantageous sensors are, for example, video sensors, radar sensors, ultrasonic sensors, or lidar sensors. Such sensors are usually already built into driver assistance systems and detect the surroundings of a vehicle with sensors. The parameters may then be formed based on the corresponding sensor signals.

BRIEF DESCRIPTION OF THE DRAWINGS

FIG. 1 shows a flow chart of a method for operating a vehicle.

FIG. 2 shows a device for operating a vehicle.

FIG. 3 shows a roadway including vehicles.

FIG. 4 shows one other roadway including vehicles.

DETAILED DESCRIPTION OF THE INVENTION

Hereafter, identical reference numerals are used for identical features.

FIG. 1 shows a flow chart of a method for operating a vehicle which moves on a roadway.

In a step 101, traffic flow of other vehicles in the surroundings of the vehicle is detected. When the detected traffic flow corresponds to a traffic jam, according to a step 103 a regulation command including a starting command is sent by a main computer to the vehicle and to the other vehicles. Then, in a step 105, a regulation of a transverse guidance of the vehicle is started in order to decrease a lateral distance between the vehicle and one of the other vehicles. In a step 107 it is provided that the other vehicles begin their transverse guidance using a respective regulation in order to set a respective lateral distance between the vehicles so that in particular the vehicles drive more closely together than before the start of the regulation so that an additional lane is formed in an advantageous way.

FIG. 2 shows a device 201 for operating a vehicle (not shown).

Device 201 includes a receiver 203 for receiving a regulation command transmitted externally of the vehicle. Furthermore, a regulation 205 is provided for regulating a transverse guidance as a function of the received regulation command to decrease the lateral distance between the vehicle and one other vehicle in the surroundings of the vehicle.

FIG. 3 shows a roadway 301.

Roadway 301 has three lanes 303, 305 and 307 situated next to one another. Road markings 309 and 311 are provided, which delimit the three lanes 303, 305 and 307 from each other.

Three vehicles 313, 315 and 317 are depicted as coming from the left and driving toward the right on the roadway. Here the three vehicles 313, 315 and 317 are respectively traveling on their own lanes 307, 305 and 303. A lateral distance between the two vehicles 315, 317 is denoted with the aid of a double arrow with reference numeral 319.

Furthermore, other vehicles are also depicted, which also travel on roadway 301. For the sake of clarity, not all vehicles are denoted with their own reference numeral.

As an example, these vehicles are to depict a traffic jam.

It is now provided that each of the vehicles detects parameters such as, for example, its instantaneous vehicle position and its instantaneous vehicle speed as a kinematic variable and transmits it to the other vehicles and to a main computer (not depicted). The other vehicles receive these parameters and may correspondingly regulate their transverse guidance. Here the regulation of the respective transverse guidance of the vehicles includes a regulation of a respective lateral relative distance 319 from one vehicle to one other vehicle. It is provided that a lateral distance is decreased. This leads in an advantageous way to four vehicles 321, 323, 325, 327 having space next to one another on roadway 301 so that the existing road width may be utilized more efficiently. This means that more vehicles may pass a certain road section at the same time compared to the case in which only one vehicle travels per lane 303, 305 and 307.

Here it is provided in particular that the regulation is only started once the main computer has transmitted a starting command and this command was received by the vehicles. The main computer thus initiates the regulation or the driving which is closer together in the traffic jam. It is preferably provided that the main computer transmits to the vehicles regulation commands which include the information that the vehicles are to drive tightly or closely next to one another in such a way that an additional lane is opened or formed.

In the regulation of the transverse guidance it is in particular provided that the vehicles ignore road markings 309 and 311 and that they travel at least in part across road markings 309 and 311.

It is also provided that, due to the regulation, more lanes are used in the case of a traffic jam or slow-moving traffic than initially provided lanes 303, 305, 307.

FIG. 4 shows roadway 301 with several vehicles. The same reference numerals are used as in FIG. 3. The respective embodiments are applicable analogously to FIG. 4.

In FIG. 4, contrary to FIG. 3, a warning sign 401 is depicted which warns the drivers of the vehicles of a road work site. Here, several traffic cones 403 are shown which close lane 307. Thus the vehicles located on lane 307 must merge into the additional lanes 303 and 305. This merging is generally carried out according to a "zipper procedure."

It is provided particularly in the traffic situation shown in FIG. 4 that the main computer transmits regulation commands to the vehicles which include the information that the vehicles are to drive so tightly or closely together that despite closed lane 307, three vehicles are still able to drive next to one another on lane 301 so that despite the narrowing due to traffic cones 403, the number of effectively used lanes does not have to be reduced in an advantageous way.

In summary, the present invention includes in particular the idea that preferably by the vehicles networking with each other, i.e., that the vehicles receive and transmit parameters, the vehicles optimize, particularly decrease, their lateral distance between one another during fully automatic driving, so that on an existing road width more vehicles may be placed next to one another. This regulation may in particular be coordinated by a main computer. This computer generally knows whether additional space for an emergency corridor for rescue vehicles is required or not. If the space for the emergency corridor is not required, the vehicles are no longer guided within the lane road markings so that more lanes may effectively be used. The main computer in particular also knows the road width and, based on that, may form regulation commands for the vehicles. It may in particular be provided for the main computer to initiate the regulation of the transverse guidance.

Due to the regulation, no lane is lost so that a traffic jam length and a delay for road users are reduced. Vehicles automatically drive more closely together in a traffic jam or in slow-moving traffic.

What is claimed is:

1. A method for controlling a plurality of vehicles which are moving on a roadway, comprising:

receiving, by a main computer, data related to a traffic flow of other vehicles in the surroundings of the plurality of vehicles;

receiving, by the main computer from each vehicle of the plurality of vehicles, at least one kinematic variable of the vehicle, the kinematic variable including at least one of a position of the vehicle, a speed of the vehicle, and an acceleration of the vehicle;

detecting, by the main computer, a traffic jam based on the received data related to the traffic flow;

based on detecting the traffic jam, determining a strategy, by the main computer, for regulating the plurality of vehicles based on the received data related traffic flow and the kinematic variable received from each of the plurality of vehicles;

transmitting, by the main computer to each vehicle of the plurality of vehicles, at least one command corresponding to the determined strategy to regulate a transverse guidance of each vehicle of the plurality of vehicles to reduce a lateral distance between the plurality of vehicles relative to one another; and regulating, by each vehicle of the plurality of vehicles in response to the at least one command, the transverse guidance of the vehicle to reduce the lateral distance, the regulating including transmitting and receiving parameters between the vehicle and others of the plurality of vehicles, and the vehicle guiding itself to reduce a lateral distance between the vehicle and at least one other vehicle of the plurality of vehicles based on the command and the parameters by modifying a respective steering angle of the vehicle.

2. The method as recited in claim 1, wherein the regulation is carried out as a function of at least one of the following parameters: a kinematic variable of the vehicle, status of a turn signal of the vehicle, status of a brake light of the vehicle, geometric width of the vehicle, or width of the roadway.

3. The method as recited in claim 2, wherein the regulation is carried out as a function of respective regulation commands received by the plurality of vehicles, the regulation commands being transmitted to the plurality of vehicles with the aid of the main computer which is located external to the plurality of vehicles.

4. The method as recited in claim 1, wherein the at least one regulation command includes at least one of the following: a starting command for starting the regulation, a stopping command for stopping the regulation, or a resumption command for resuming the regulation after stopping the regulation.

5. The method as recited in claim 3, wherein the at least one parameter is transmitted to the main computer, and wherein the main computer forms the regulation commands based on the at least one parameter.

6. A non-transitory, computer-readable data storage medium storing a program instructions which, when executed on a computer, perform a method for controlling a plurality of vehicles which are moving on a roadway, the method comprising:
  receiving data related to a traffic flow of other vehicles in the surroundings of the plurality of vehicles;
  receiving, by the main computer from each vehicle of the plurality of vehicles, at least one kinematic variable of the vehicle, the kinematic variable including at least one of a position of the vehicle, a speed of the vehicle, and an acceleration of the vehicle;
  detecting a traffic jam based on the received data related to the traffic flow; and
  based on detecting the traffic jam, determining a strategy for regulating the plurality of vehicles based on the received data related traffic flow and the kinematic variable received from each vehicle of the plurality of vehicles; and
  transmitting, to each vehicle of the plurality of vehicles, at least one command corresponding to the determined strategy to regulate a transverse guidance of each vehicle of the plurality of vehicles to reduce a lateral distance between the plurality of vehicles relative to one another, the regulating including modifying a respective steering angle of the vehicle.

7. The method as recited in claim 1, further comprising determining whether the detected traffic flow corresponds to the traffic jam based on comparing a number of vehicles per unit time of the traffic flow to a predetermined threshold value.

8. The method as recited in claim 1, further comprising determining whether the detected traffic flow corresponds to the traffic jam based on comparing a number of vehicles per route length of the traffic flow to a predetermined threshold value.

9. The method as recited in claim 1, further comprising determining whether the detected traffic flow corresponds to the traffic jam based on comparing a speed of vehicles of the traffic flow to a predetermined threshold value.

10. The method as recited in claim 1, wherein the regulating the transverse guidance of each vehicle of the plurality of vehicles guides the vehicle around an obstacle, the obstacle including at least one of: a road work site, or an accident.

11. The method as recited in claim 1, wherein the regulating the transverse guidance results in a number of vehicles traveling next to one another on the road way after the beginning of the regulation being greater than a number of vehicles traveling next to one another on the roadway before the beginning of the regulation.

12. The method as recited in claim 1, wherein the regulating the transverse guidance includes guiding at least one of the plurality of vehicles to drive over road markings delineating traffic lanes of the roadway.

13. The method as recited in claim 1, wherein based on the transmitted at least one command, each vehicle of the plurality of vehicles guiding itself to reduce the lateral distance between the vehicle and the at least one other vehicle of the plurality of vehicles in such a manner that a number of vehicles traveling next to one another on the road way after the beginning of the regulation is greater than a number of vehicles traveling next to one another on the roadway before the beginning of the regulation.

* * * * *